E4819 XR 3,470,326

[redacted]

Sept. 30, 1969 F. GRETTEBERG 3,470,326

SELECTIVE CALLING SYSTEM EMPLOYING AN INTERDIGITAL TONE TO AID IN DISCRIMINATION BETWEEN SIGNAL TONES

Filed March 2, 1967 3 Sheets-Sheet 1

INVENTOR
FREDRIK GRETTEBERG
BY Young & Thompson
ATTORNEYS

Sept. 30, 1969 F. GRETTEBERG 3,470,326

SELECTIVE CALLING SYSTEM EMPLOYING AN INTERDIGITAL TONE TO AID IN DISCRIMINATION BETWEEN SIGNAL TONES

Filed March 2, 1967 3 Sheets-Sheet :

INVENTOR

FREDRIK GRETTEBERG

BY Young + Thompson

ATTORNEYS

Sept. 30, 1969 F. GRETTEBERG 3,470,326

SELECTIVE CALLING SYSTEM EMPLOYING AN INTERDIGITAL TONE TO AID IN DISCRIMINATION BETWEEN SIGNAL TONES

Filed March 2, 1967 3 Sheets-Sheet 3

INVENTOR
FREDRIK GRETTEBERG
BY Young & Thompson
ATTORNEYS

United States Patent Office 3,470,326
Patented Sept. 30, 1969

3,470,326
SELECTIVE CALLING SYSTEM EMPLOYING AN INTERDIGITAL TONE TO AID IN DISCRIMINATION BETWEEN SIGNAL TONES

Frederik Gretteberg, Oslo, Norway, assignor to A/S Lehmkuhl, Oslo, Norway

Filed Mar. 2, 1967, Ser. No. 620,067
Int. Cl. H04m 5/04
U.S. Cl. 179—41 3 Claims

ABSTRACT OF THE DISCLOSURE

A selective calling system for radio communication, in which a coded calling signal consisting of two speech frequency modulation signals of a group of five and a sixth audio frequency is transmitted, of which the sixth lies within the speech frequency band and is transmitted in each of the spaces between the code signals, in such a way that all these individual signals follow one another in continuous sequence.

This invention relates to a selective calling system, preferably for radio communication between fixed and mobile or between mobile radio telephony stations, in which use is made of a code system where, for each digit in a decade calling number, a code signal is transmitted consisting of two simultaneously transmitted speech frequency modulation signals out of a group of five frequencies, and in which, in addition to the digit code signals, a sixth audio frequency code signal is radiated.

In German patent specification No. 908,150, a system is described in which immediately before each code signal, a preparatory signal is transmitted which, with the help of an A.C. polarized relay, or a D.C. relay, neutralises the blocking of, or connects, the code receiver during the short period in which the code signal is being received. For the preparatory signal, a frequency of 50 or 150 c./s. is indicated, or it may consist of D.C. pulses, and is intended for transmission by wire.

For radio transmission, where the quality of the transmitted signals can vary greatly, it is usual to utilize a comparatively narrow prescribed frequency range of 300–3,000 c./s. The system described is therefore not well suited for radio transmission, and a further point is that by extending the frequency band, so that frequencies of 50 or 150 c./s. would be able to pass, harmonic overtones could easily be formed as a result of distortion in the transmission equipment, with resultant deterioration in quality. When using such low frequencies as 50 or 150 c./s., it is difficult to keep the dimensions of the frequency selective circuits down to reasonable limits in the light of the fact that technical developments today are in the direction of miniaturisation.

Selective calling systems of this type are also known, and, broadly speaking, they may be divided into two main groups:

(1) The call code is transmitted as a rapid pulsing of two tones, for example 600 and 1,600 c./s.

(2) The call code is transmitted as a combination of two or more tones which are radiated simultaneously for comparatively long periods.

Other known methods incorporate frequency selective (vibrating reed) relays or electrical resonant circuits for the frequency selective reception of the radiated tones or combination of tones.

In this present invention, a vibrating relay is used as the frequency selective component.

When planning a selective calling system for connecting to the public telephone network, great emphasis must be laid on the reliability of the system. The system must, as far as possible, be immune to false calls caused by incorrect decoding, radio noise, speech signals or other forms of interference, whilst at the same time it must have the highest possible degree of reliability that the selective calling signals call the desired mobile subscriber.

This last feature can often be difficult in VHF radio communication on account of "rapid fading" or "holes" in the field strength from the fixed transmitter to the mobile receiver when the latter is in movement. American investigations have shown that these "holes" or dead zones in the field strength can result in the signal to the receiver falling out for a period of up to 100 millisecs. A system incorporating rapid pulsing between two tones, as mentioned under (FIGURE 1) above can hardly, under such conditions, give the required assurance that the call will pass without error, as individual pulses may be lost when passing through dead zones of this type if the duration of a single pulse is less than about 100 millisecs.

The object of this invention therefore is to furnish a selective calling system for radio communication in which the frequency of the preparatory signal lies in the speech band itself and using code signals of comparatively long duration in a decade digit system, which may readily be expanded to accommodate any required number of digits and which has the greatest possible protection against erroneous decoding and false calling, and which in a simple manner can be made to suit standard automatic telephone equipment.

This is achieved, according to the invention, by the sixth code signal, which lies inside the speech frequency band, being radiated during each space between the digit code signals, in such a manner that all these individual signals follow one another in a continuous sequence, that the code receiver of the system for the registration of the call is equipped with a set of cascade coupled flip-flop circuits which, on receiving the alternately radiated digit code signal and the sixth code signal, is triggered sequentially to the working position, to supply an output signal, that the flip-flop circuits are so connected that the first circuit in the cascade is triggered by the first digit code signal, whilst the following circuits are triggered only if they receive the respective code signal and the output signal from the preceding circuit simultaneously, and that the circuits' output signals are not supplied until the moment their code signals cease, and have predetermined duration, in such a manner that the flip-flop circuits flip back to their rest positions and thus interrupt the decoding of the number called if the time interval between the beginning of two consecutive code signals exceeds a certain limit.

The advantages of transmitting a sixth audio frequency modulation signal between each digit code are, firstly, that all the combinations of digits in a multi-digit number may be used, and secondly that the code receiver is prevented from erroneously decoding signals which have been disturbed by, for example, fading. Without an indication of the transition from one digit to the next, it would not be possible to repeat the same number as neighbouring digits in a code number, for example 11, 22, etc. The code receiver would be able to decode this erroneously as one digit. If we were to dispense with all number combination 11, 22 etc. we would, with, for example, a 5 digit code system, lose 40% of the total number of possible combinations. As mentioned above, in radio transmissions in which fading occurs, there is the possibility that the signal strength for short periods falls to zero or to such low values that the signals are not registered by the code receiver. If a short duration minimum of this type occurs at an unfortunate moment, with the result that the code receiver receives the first and the last part of the digit information, if would, if the additional signal had not been inserted between each code combination, decode this as a repetition of the same digit.

The selective call is composed of six different frequencies within the speech band which are radiated, partly individually, and partly as combinations of two tones. Five of the tone are used for the digit coding itself according to the system, two tone out of five (which gives ten possible combinations corresponding to digits 0 to 9), the sixth tone is used for digit change, that is to say, to indicate the transistion from one digit to the next. A complete call signal, for example a three digit number, will thus consist of the following individual signals:

(1) Tone combination for first digit.
(2) Digit change tone.
(3) Tone combination for second digit.
(4) Digit change tone.
(5) Tone combination for third digit.

All these individual signals follow one another in continuous sequence, and the duration of each individual signal may be, for example, 250 millisecs. A call will thus take only 1.25 seconds, whilst at the same time the individual signals are of sufficient duration to ensure that they have a very good chance of getting through even in regions where there is strong rapid fading.

As will be seen, never more than 2 tones are transmitted simultaneously. By ensuring that these 2 tones gives maximal modulations of the VHF transmitter, we achieve a good signal to noise ratio.

An apparatus for selective calling along these lines, in which, for the time-limited registration of each digit code, is used a monostable flip-flop circuit, and in which this circuit is controlled by an "and" circuit, has according to the invention the characteristic feature that in the "and" circuit there is a capacitor the purpose of which is to hold the flip-flop circuit in the working state for a period of time after the cessation of the incoming signal which controls the "and" circuit.

A preferred apparatus of this type, according to the invention, has the characteristic feature that there is a diode-resistance coupling from two of the "and" circuit's control inputs to the base of the transistor in the flip-flop circuit which, when the coupling is in the rest position, is conducting, the purpose of this being to prevent the flip-flop circuit from flipping over into the working state as long as there is a control signal on the two above mentioned inputs.

An example of the invention will be described in more detail below with reference to the drawings.

Figure 1:
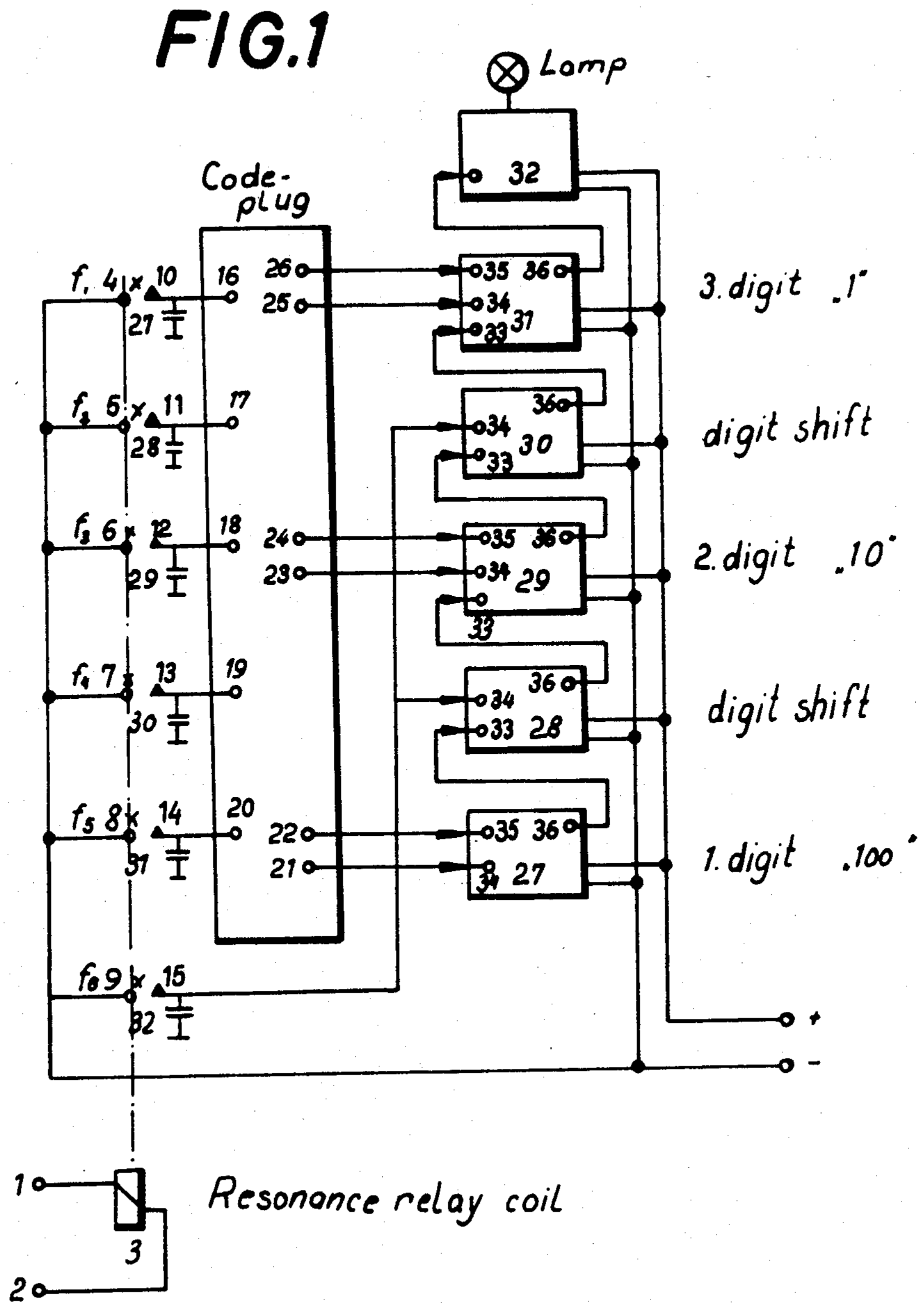
FIGURE 1 is a circut diagram of a selective call system according to the invention.

From the output of the radio receiver, the signals are fed through the iput terminals 1 and 2 to the coil of a frequency selective relay 3. This relay has a series of reeds, 4–9, which which are tuned to the frequencies $f1$–$fs$. When an alternating voltage with a frequency corresponding to one of the above mentioned resonant frequencies $f1$–$fs$ is fed to the relay coil, the appropriate relay reed will vibrate and make intermittent contact with the apertaining fixed contact. The fixed contacts are marked 10–15. The relay reeds are connected to the negative rail in the apparatus.

Each of the relay contacts 10–15 are connected to connecting points 16–20 in a cross-coupling block which in practice is in the form of a "code plug." When a relay reed vibrates and makes intermittent contact with its corresponding fixed relay contact, the appertaining connection point in the cross-coupling block will receive negative potential. The capacitors 27–32 serve to smooth out the voltage pulses caused by the intermittent contact.

The above mentioned cross-coupling block has also a number of other connection points 21–26. The number of these connection points is dependent upon the number of digits for which the system is built. Two such connection points are required for each digit, and in the example shown the receiver has been built for three digit call numbers; the number of connecting points is thus 6. Blocks 27, 28, 29, 30 and 31 are transistorised register circuits. They are, in principle, of similar construction except that some of them have two control inputs 33, 34 or 34, 35, others have three inputs 33, 34, 35 dependent upon their position in the function sequence, and also an output 36. The purpose of the register circuit is to transfer the control pulses in a very special manner from the inputs to the output. The control pulses from the output of a register circuit are fed to input 33 of the next register circuit in the function sequence.

Figure 2:
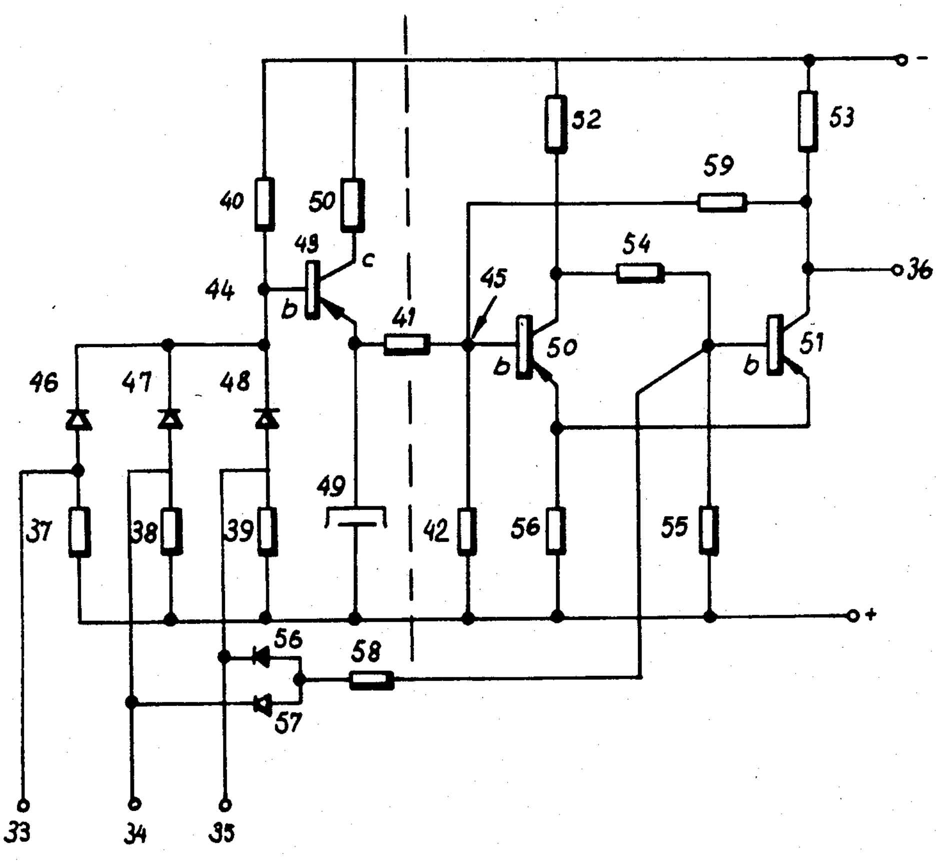
FIGURE 2 is a circuit diagram of a registering circuit according to the invention.

FIGURE 2 shows a circuit diagram of a register circuit. In principle this is composed of a mono-stable flip-flop circuit, and an "and" circuit with two, respectively three, inputs, and which control the flip-flop circuit. Further, the circuit contains a capacitor, two diodes and a resistor which gives the entire register circuit special characteristic features.

These desired special characteristic features are as follows:

(1) The register circuit must give a pulse on its output only after having received negative control pulses on all inputs simultaneously.

(2) It must give a pulse on the output only if the control pulses on inputs 34 and 35 cease simultaneously.

(3) It must not give a pulse on the output as long as there are control voltages on inputs 34 and 35. The output pulse must start at that moment these two control voltages disappear.

(4) The pulse on the output must have a limited duration after which the entire circuit flips back to its rest state.

With the help of FIGURE 2 the modus operandi of the register circuits will be described below in more detail.

The circuit to the left of the broken line in the diagram is the above mentioned "and" circuit. The circuit to the right is the monostable flip-flop circuit, also called "Schmitt trigger."

The "and" circuit works as follows:

Resistors 37, 38, and 39 are, individually, small compared to resistor 40. Resistors 41 and 42 are of the same size as each of the individual resistors 37, 38, and 39, and are in series with the emitter lead to transistor 43.

In the rest state, current passes from the minus rail through resistor 40 and further through 37, 38, and 39 in parallel to the positive rail. As 37, 38 and 39 are small compared to 40, point 44 (the base of transistor 43) will assume a potential near that of the positive rail. The current through transistor 43 will thus be quite weak and point 45 will thus also assume a potential near that of the positive rail.

If one or two of the resistors 37, 38 and 39 is removed or blocked for the passage of current, the potentials at points 44 and 45 will increase somewhat but not sufficiently to cause the flip-flop to change state. Each of the resistors 37, 38 and 39 can be blocked for current which passes through resistor 40 by placing a sufficiently large negative voltage on the respective inputs 33, 34 and 35.

The diodes 46, 47 and 48 prevent the negative control voltages from reaching point 44.

If all three of the inputs 33, 34, and 35 receive a negative control voltage, all three resistors 37, 38 and 39 will be blocked for the passage of current from resistor 40, and this thus now only conducts base current to transistor 43. The voltage drop over resistor 40 thus falls to a fraction of the voltage drop in the rest state, and point 44 assumes a potential approaching that of the negative rail. The result of this is that transistor 43 is bottomed and has very little internal resistance. Capacitor 49 will therefore be charged very quickly to almost full negative potential through transistor 43 and resistor 50 which is relatively small, and is merely there to limit the maximum current through the transistor.

When one or more of the control inputs 33, 34, 35 again lose their control voltages, point 44 will return to its rest potential, transistor 43 is cut off and capacitor 49 is discharged through resistors 41 and 42, and also through the base of transistor 50.

Transistors 50 and 51, together with resistors 52, 53, 54, 55 and 56, form an ordinary monostable flip-flop circuit. In the rest state, transistor 50 is cut-off and transistor 51 is bottomed. Resistor 56 is low and the voltage between the output 36 and the positive terminal is therefore small.

As already mentioned, when there is a negative control voltage on all three inputs, capacitor 49 will charge rapidly to a voltage approaching that on the negative rail, and the potential at point 45 will increase correspondingly. In an ordinary monostable flip-flop circuit this would result in the circuit immediately "flipping over" (changing state) as soon as point 45 had reached a certain voltage.

In order to prevent this (cf. the special qualities required of the register circuit—item 3 above) the circuit contains two diodes, 56 and 57, and also a resistor 58. The cathodes of these diodes are connected to their respective inputs 34 and 35, and the anodes are connected to a common resistor 58. The other end of this resistor goes to the base of transistor 51. The object of the diodes 56 and 57 is to prevent mutual coupling between the inputs 34 and 35.

The effect of this coupling is that as long as a negative control voltage is impressed on inputs 34 and/or 35, the same negative control voltage(s) will be conducted through resistor 58 to the base of transistor 51. Provided the components have the right values, this extra negative voltage to the base of transistor 51 will prevent the circuit from "flipping" over, even though there may be full negative voltage across capacitor 49. But as already explained, capacitor 49 will charge up and "prepare" the flipping provided all three inputs have a negative control voltage.

At that moment the negative control voltage is removed from inputs 34 and 35, the base of transistor 51 loses its extra negative voltage and the circuit changes state. Transistor 51 is thus cut-off and the voltage between output 36 and the positive rail rises approaching the operational voltage used. The voltage on the output of 36 is used to control input 33 of the next register circuit in the function sequence.

The duration of the voltage pulse on output 36 is primarily decided by the discharging time of capacitor 49. This time constant is determined by the size of the capacitor and the values of resistors 41 and 42, and also by the base resistance in transistor 50. In order, to a certain extent, to increase the pulse length with given capacitor and resistor values, positive feed-back is used from the collector of transistor 51 to the base of transistor 50 through resistor 59.

The duration of the output pulses must at least equal the duration of each of the individual tone signals received in a call, that is to say in the example chosen here, at least 250 millisecs.

Figure 3:
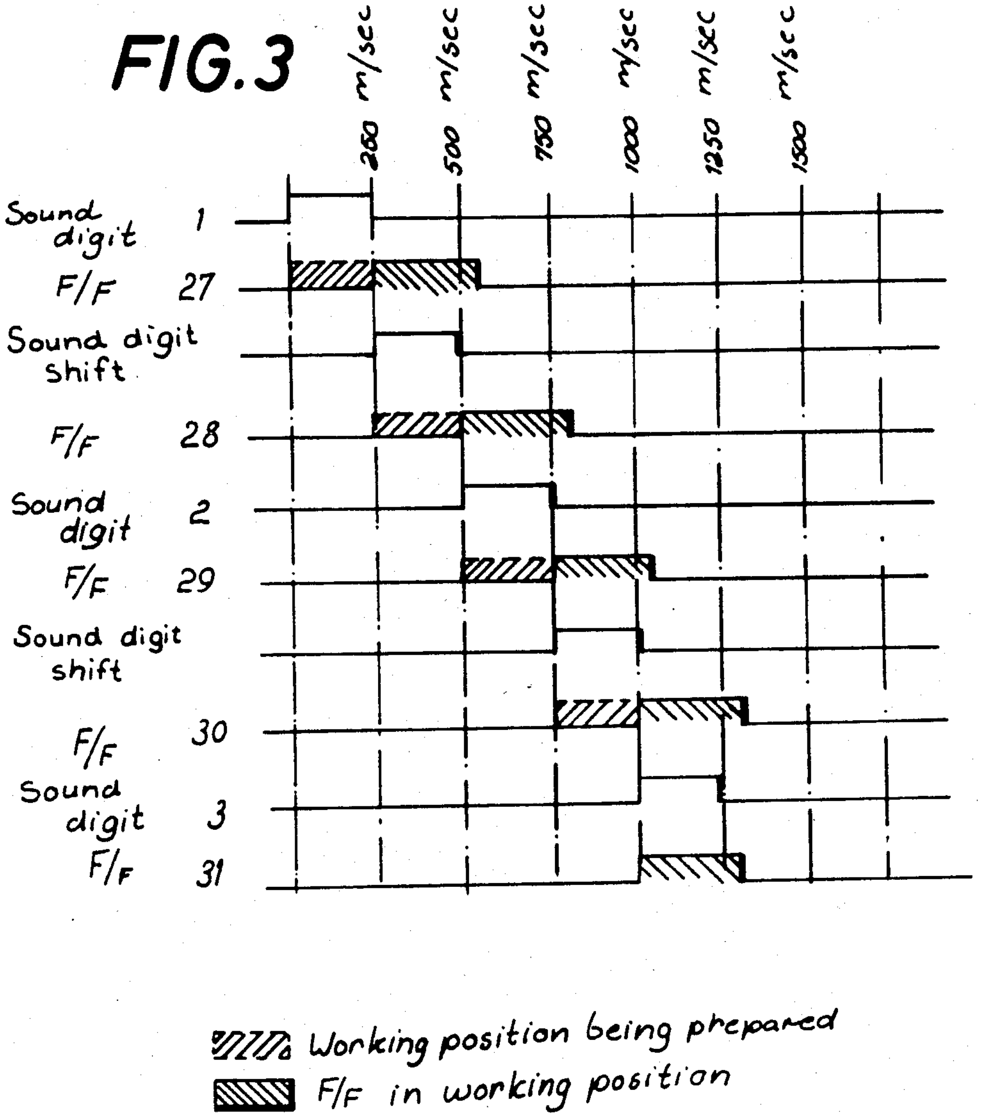
FIGURE 3 is a time diagram to faciltate the explanation of the modus operandi of the system.

In FIGURE 3, a function/time diagram is shown for a correctly received three digit call, that is to say a call which corresponds to the code plug inserted in the receiver concerned. The sequence of functions will thus be:

(1) Two-tone combination for the first digit is received. Two of the relay reeds *f1–f5* vibrate, and through the code coupling in the code plug the negative control voltage is impressed on inputs 34 and 35 in the register circuit 27 (FIGURE 1). This circuit does not have a 33 input.

Capacitor 49 in this circuit is charged and prepares a pulse for output 36.

(2) As soon as the tone combination for the first digit ceases after 250 millisecs., circuit 27 changes state and impresses a negative control voltage on input 33 to circuit 28. At the same time a change tone *fs* is received, and this results in a negative control voltage on input 34 in the register circuit 28. (Register circuit 28 does not have a 35 input.) Capacitor 49 in this circuit will therefore be charged and prepare a pulse for output 36 in circuit 28.

(3) As soon as the change tone ceases after 250 millisecs., circuit 28 will change state and give a control voltage to input 33 in circuit 29. At the same time the two-tone combination for the second digit is received, and this results in a negative voltage being impressed on inputs 34 and 35 in circuit 29.

(4) As soon as the two-tone combinations for the second digit ceases, circuit 29 will change state and supply a control voltage to circuit 30 etc.

(5) Finally, circuit 31, after having received the two-tone combination for the last digit, will change state and supply a control voltage to the indicator circuit 32. This may for example be so arranged that it gives a short duration acoustic signal, where upon it lights a warning lamp which remains lit until it is extinguished manually by the subscriber being called.

As may be seen from the above, the conditions required to receive a call are that the correct tone combinations are received in the proper sequence and at the right tempo. Each of the register circuits, with the exception of the first, is dependent both upon it having received its correct signal and that the preceding circuit in the chain has received its correct signal, and that the time interval between the two signals is zero or within the tolerances permitted by the system.

Having described my invention, I claim:

1. A selective calling system, preferably for radio communication between fixed and mobile, or between mobile radio telephone stations, in which a code system is used whereby for each digit in a decade calling number a code signal is radiated consisting of two simultaneously radiated speech frequency modulation signals out of a group of five frequencies and in which, in addition to the digit code signals, a sixth audio frequency code signal is transmitted, wherein the sixth code signal, which lies within the speech frequency band, is transmitted in each of the spaces between the digit code signals, in such a way that all these individual signals follow one another in continuous sequence, that the systems' code receiver for the registration of the call contains a set of cascade coupled flip-flop circuits which on receiving the alternately radiated digit code signal and the sixth code signal, are triggered seqentially to the working state to supply an output signal, that the flip-flop circuits are so connected that the first circuit in the cascade is triggered by the first digit code signal, whilst the following circuits are triggered only if they receive the respective code signal and the output signal from the preceding circuit simultaneously, and that the circuits' output signals are not given until the moment their code signals cease and have predetermined duration, in such a manner that the flip-flop circuits return to the rest position and thus interrupt the decoding of the number called if the time interval between the beginning of two consecutive code signals exceeds a certain limit.

2. A selective calling system according to claim 1 in which, for the time-limited registration of each code signal, a transistorised monostable flip-flop circuit is used, and in which this circuit is controlled by an "and" circuit, wherein the "and" circuit contains a capacitor, the purpose of which is to hold the flip-flop circuit in the working state for a period of time after the incoming control signal to the "and" circuit has ceased.

3. A selective calling system according to claim 2 wherein a diode-resistance coupling from two of the "and" circuit's control inputs to the base of the transistor in the flip-flop circuit, when the circuit is in the rest state, is conducting for the purpose of preventing the flip-flop circuit from flipping over into the working state as long as there is a control signal on the above mentioned two inputs.

References Cited

UNITED STATES PATENTS

| | | | |
|---|---|---|---|
| 2,524,782 | 10/1950 | Ferrar et al. | 325—64 |
| 2,547,025 | 4/1951 | Noble. | |

KATHLEEN H. CLAFFY, Primary Examiner

JAN S. BLACK, Assistant Examiner

U.S. Cl. X.R.

340—146.1